I. CHIGE.
DENTAL BROACH.
APPLICATION FILED OCT. 28, 1915.
1,230,561.
Patented June 19, 1917.
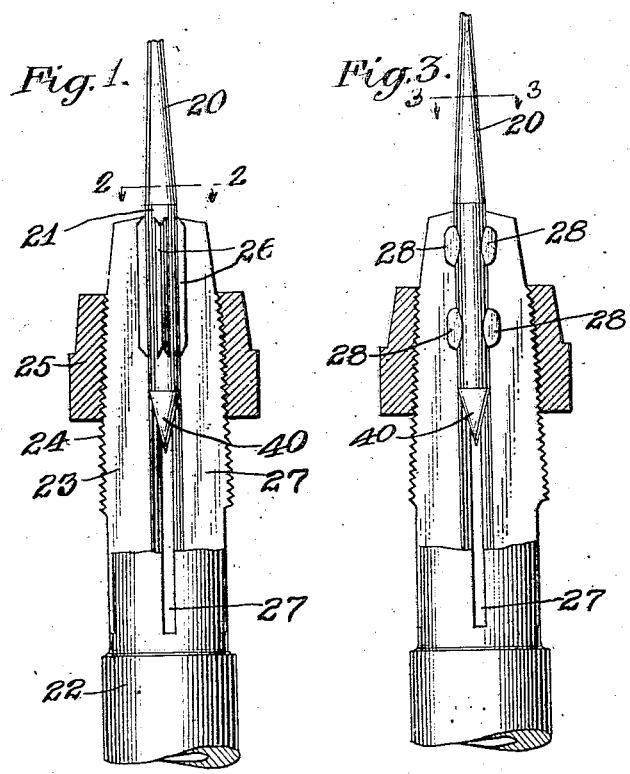
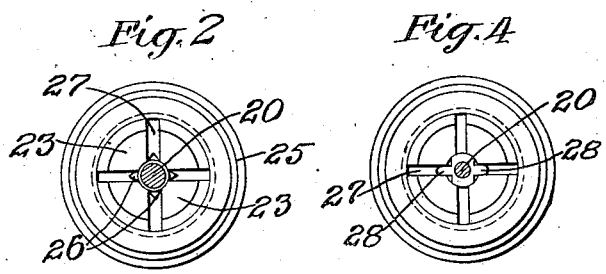
Inventor
Isidor Chige
By his Attorneys
Ashley & Cohen

UNITED STATES PATENT OFFICE.

ISIDOR CHIGE, OF NEW YORK, N. Y.

DENTAL BROACH.

1,230,561.  Specification of Letters Patent.  Patented June 19, 1917.

Application filed October 28, 1915. Serial No. 58,319.

*To all whom it may concern:*

Be it known that I, ISIDOR CHIGE, a citizen of the United States, and a resident of New York city, in the county of New York and State of New York, have invented certain new and useful Improvements in Dental Broaches, of which the following is a specification.

This invention relates to broaches such as are used by dentists in extracting nerves.

These dental broaches are very small instruments, the operative portion of which is often less than seven thousandths of an inch in diameter and the shank portion two to three hundredths of an inch in diameter. This makes it difficult to properly grip the instrument in a chuck to prevent both rotation and longitudinal movement. My invention aims to overcome this difficulty, and to this end, I provide the tool with a shank which is so interlocked and gripped with the holding means that all danger of relative movement is avoided.

In the drawing,

Figure 1 is a sectional elevation on a greatly enlarged scale of one form of broach and chuck in which my invention is embodied.

Fig. 2 is a sectional plan view, the section being taken along line 2—2 of Fig. 1.

Fig. 3 is a sectional elevation similar to Fig. 1 illustrating a modification.

Fig. 4 is a section taken along line 3—3 of Fig. 3.

Referring in detail to Figs. 1 and 2 the broach has the operating portion 20 and the shank portion 21 held in the chuck 22 having the four jaws 23. The latter are formed with the tapered thread 4 on which is screwed a nut 25 provided with a thread of corresponding taper. By the taper-threaded engagement of the nut and jaws, the latter may be clamped to hold the shank of a tool, as will be readily understood. Ordinarily, in constructions hitherto used, the gripping action of the chuck is merely frictional, and, therefore, not sufficiently effective with so small a construction as a dental broach. This difficulty is overcome as follows: The shank 21 has a series of longitudinal ridges 26 preferably four in number corresponding to the jaws 23. When the broach is inserted in the chuck, it is turned so that the ridges register with the spaces 27 between the jaws 23. Thus, when the latter are firmly clamped on about the shank, the ridges 26 will positively prevent any turning of the shank relative to the jaws.

In the modified form illustrated in Figs. 3 and 4, the broach has the operative portion and shank portion as in the first form described. However, instead of having the continuous longitudinal ridges, the shank is provided with a number of longitudinally spaced flat-faced lugs 28 which enter into the slots 27 between the jaws of the chuck. The construction of the chuck may be the same as in the first form described.

To promote the facility for inserting the shank in proper position between the jaws, the extremity thereof is formed with a tapering point 40 in the two forms of the invention described. This will make it easy for the operator to find the center of the chuck and the shank will enter without any difficulty. In case the jaws are sprung too close together, the wedging action of the point will tend to separate them. However, should the operator inadvertently insert the shank out of center, although the broach may skew somewhat between the jaws, it will, by reason of the structure of the shank, be held from rotation relative to the chuck, and therefore, will operate properly during the course of its use. But, with the forms of shank above described, the insertion of the broach in proper position is a very easy matter and will be accomplished by the operator without need of exercising undue care. It will be noted that in all of these forms the shank can be readily fashioned by a simple forging operation and will, therefore, not be expensive to make.

Having thus described my invention, I claim as new and desire to secure by Letters Patent:

1. In combination, a dental broach comprising an operative portion and a shank portion having longitudinal projections subtending a substantial portion of the length of the shank, a socket having spring jaws with spaces therebetween, said spaces being of greater width than the projections, said projections extending into corresponding portions of said spaces interengaging with said jaws in said spaces along a substantial portion of the length of the shank, said jaws having an exterior tapered thread and a nut engaging the thread to compress the jaws so as to clamp the shank between the projections and interlocking therewith, whereby rotation of the shank in the socket is securely prevented.

2. In combination, a dental broach comprising an operative portion and a shank portion having a plurality of diametrically opposite spaced lateral projections extending longitudinally along the major portion of the length of the shank, a socket having spring jaws with spaces therebetween, said spaces being of greater width than the projections, said projections extending into corresponding portions of said spaces interengaging with said jaws in said spaces whereby rotation of the shank in the socket is prevented, said jaws having exterior tapered threaded portions and a nut engaging said threaded portion to clamp the jaws together about the shank.

Signed at New York city, in the county of New York, and State of New York, this 27th day of October A. D. 1915.

ISIDOR CHIGE.

Witnesses:
NATHAN COHEN,
MINNIE S. MILLER.